US008780233B2

(12) United States Patent
Bekiares et al.

(10) Patent No.: US 8,780,233 B2
(45) Date of Patent: Jul. 15, 2014

(54) METHOD AND APPARATUS FOR MAINTAINING A MINIMUM PIXEL DENSITY ACROSS AN OBJECT OF INTEREST

(75) Inventors: Tyrone D. Bekiares, Chicago, IL (US); Kevin J. O'Connell, Palatine, IL (US); Steven D. Tine, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 345 days.

(21) Appl. No.: 13/329,969

(22) Filed: Dec. 19, 2011

(65) Prior Publication Data

US 2013/0155295 A1 Jun. 20, 2013

(51) Int. Cl.
*H04N 5/262* (2006.01)
(52) U.S. Cl.
USPC .................................................. 348/240.99
(58) Field of Classification Search
USPC .................................................. 348/240.99
See application file for complete search history.

(56) References Cited

U.S. PATENT DOCUMENTS

| 6,631,240 | B1 * | 10/2003 | Salesin et al. | 386/290 |
| 2002/0120611 | A1 * | 8/2002 | Kernz | 707/1 |
| 2002/0120753 | A1 * | 8/2002 | Levanon et al. | 709/228 |
| 2002/0143972 | A1 * | 10/2002 | Christopoulos et al. | 709/231 |
| 2007/0024706 | A1 * | 2/2007 | Brannon et al. | 348/142 |
| 2007/0120979 | A1 | 5/2007 | Zhang et al. | |
| 2010/0064002 | A1 * | 3/2010 | Levanon et al. | 709/203 |
| 2010/0214419 | A1 * | 8/2010 | Kaheel et al. | 348/207.1 |
| 2010/0242081 | A1 * | 9/2010 | Dunn et al. | 725/126 |
| 2011/0102634 | A1 | 5/2011 | Pardue | |

OTHER PUBLICATIONS

Schulzrinne, H. et al., "RTP: A Transport Protocol for Real-Time Applications," Network Working Group, Request for Comments 3550, pp. 89, Jul. 2003.
Jun Wang, et al. "Adaptive Monitoring for Video Surveillance", ICICS-PCM 2003, Singapore; Dec. 15-18, 2003.

* cited by examiner

*Primary Examiner* — James Hannett
(74) *Attorney, Agent, or Firm* — Kenneth A. Haas

(57) ABSTRACT

A method includes receiving a frame containing an object of interest and determining a current pixel density of the object of interest. The current pixel density is compared to a minimum pixel density to generate a comparison result and an indication is received of available throughput of a wireless network used to transmit the video. Based on the comparison result and the available throughput, a pixel density compensation method is selected from multiple methods, which include adjusting a zoom feature of a camera used to capture the video and adjusting encoded frame resolution. Using the selected pixel density compensation method, a pixel density compensation parameter is determined to adjust the current pixel density with respect to the minimum pixel density for the object of interest. The pixel density compensation parameter is provided to one or both of the camera or an encoder that sends the video over the wireless network.

18 Claims, 4 Drawing Sheets

METHOD AND APPARATUS FOR MAINTAINING A MINIMUM PIXEL DENSITY ACROSS AN OBJECT OF INTEREST

FIELD OF THE DISCLOSURE

The present disclosure relates generally to video analytics and more particularly to a method and apparatus for maintaining a minimum pixel density across an object of interest within video transmitted over a wireless network.

BACKGROUND

Video applications are quickly emerging as an essential component of effective Public Safety communications. Accordingly, minimum quality standards for Public Safety video systems are beginning to emerge. For example, the Video Quality in Public Safety (VQiPS) Working Group was created to develop technical performance specifications and standards for the use of video in Public Safety applications.

Among other metrics specified, the video quality standards will indicate a minimum pixel density, meaning a minimum number of pixels over an area spanning an object of interest (e.g., a person, a car, etc.) in a video frame to complete a specified mission or use of the video (e.g., Positive Identification (ID)). A minimum pixel density metric may, for instance, serve as a standard as to whether or not certain video content is acceptable evidence in a court of law. Simply specifying an encoded frame resolution (e.g., 640×480) is not sufficient since, depending on the optical field of vision (FoV) of the camera used to generate the video frame, the object of interest may or may not occupy a sufficient number of pixels to complete a specified mission. For example, although 320× 240 is a seemingly "low" encoded resolution, it may be sufficient if the field of vision of the camera is such that the object of interest occupies all 320×240 captured pixels. Conversely, although 1280×720 is a seemingly "high" resolution, it may be insufficient for a given mission if the object of interest occupies only 160×120 pixels of the overall frame.

In addition to the minimum pixel density, other parameters are important to consider when using video for Public Safety applications. For example, for a given mission, it is often important to maintain a maximum field of vision in order to maximize situational awareness for Public Safety officers monitoring the video. Moreover, many times the video captured for the mission is sent to viewers over a wireless network, wherein the current throughput of the network impacts the quality of the transmitted video. However, there currently exists no mechanism for taking into consideration all of these factors in capturing video for use in certain applications, such as Public Safety applications.

Accordingly, there is a need for a method and apparatus for maintaining a minimum pixel density across an object of interest within video transmitted over a wireless network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
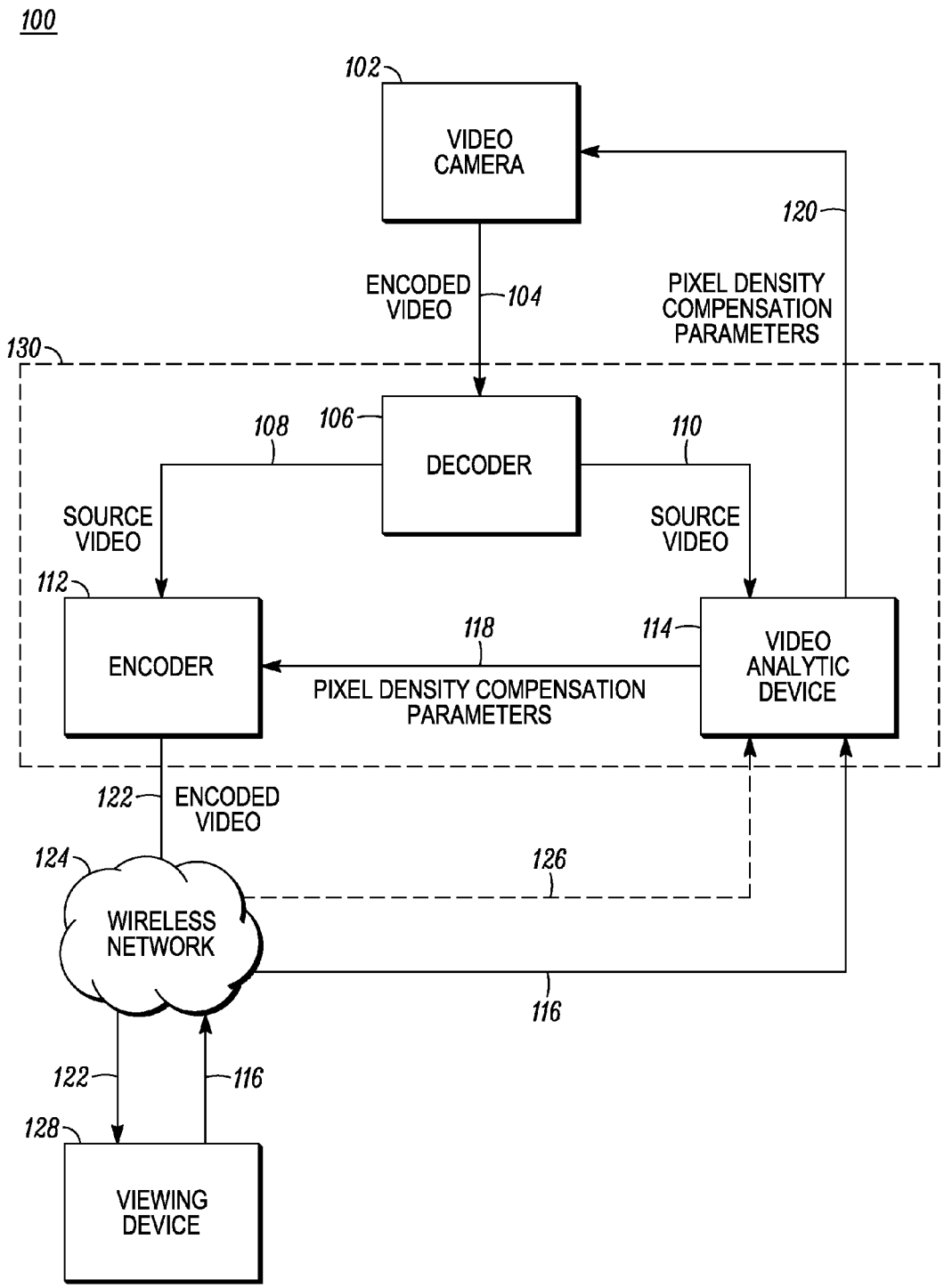
FIG. 1 illustrates a block diagram of a system adapted to implement a method for maintaining a minimum pixel density across an object of interest within video transmitted over a wireless network, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for maintaining a minimum pixel density across an object of interest within video transmitted over a wireless network. In accordance with the present teachings, the method is performed by a video analytic device. Moreover, a non-transient computer-readable storage element has computer readable code stored thereon for programming a computer to perform the method.

The method includes receiving a frame of video, wherein the received frame contains an object of interest, and determining a current pixel density of the object of interest within the received frame. The method further includes comparing the current pixel density to a minimum pixel density for the object of interest to generate a comparison result and receiving an indication of available throughput of a wireless network used for transmitting the video to a viewing device. In addition, the method selects a pixel density compensation method from a plurality of pixel density compensation methods used to adjust the current pixel density. The selecting is based on the comparison result and the indication of available throughput. The plurality of pixel density compensation methods includes a first method of adjusting a zoom feature of a camera used to capture the video and a second method of adjusting encoded frame resolution for at least one of the camera or an encoder used to encode the video for transmission to the viewing device over the wireless network. Finally, the method determines, using the selected pixel density compensation method, a pixel density compensation parameter to adjust the current pixel density with respect to the minimum pixel density for the object of interest and provides the pixel density compensation parameter to at least one of the camera or the encoder. The selecting, determining and providing are ideally performed at least until the minimum pixel density is met or can be performed until it is determined that the minimum pixel density cannot be met due to device constraints.

The apparatus, for maintaining a minimum pixel density across an object of interest, includes an interface configured to receive a frame of video, wherein the received frame contains an object of interest and receive an indication of available throughput of a wireless network used for transmitting the video to a viewing device. The apparatus further includes a processing device configured to: determine a current pixel density of the object of interest within the received frame; compare the current pixel density to a minimum pixel density for the object of interest to generate a comparison result; select a pixel density compensation method from a plurality of pixel density compensation methods used to adjust the current pixel density, wherein the selecting is based on the comparison result and the indication of available throughput, wherein the plurality of pixel density compensation methods comprises a first method of adjusting a zoom feature of a camera used to capture the video and a second method of adjusting encoded frame resolution for at least one of the camera or an encoder used to encode the video for transmission to the viewing device over the wireless network; and determine, using the selected pixel density compensation method, a pixel density compensation parameter to adjust the current pixel density with respect to the minimum pixel density for the object of interest. The interface is further configured to provide the pixel density compensation parameter to at least one of the camera or the encoder.

Referring now to the drawings, and in particular FIG. 1, an illustrative system implementing embodiments in accordance with the present teachings is shown and indicated generally at 100. System 100 comprises: a video camera 102; an intermediary (transcoding) device 130 that includes a decoder 106, an encoder 112, and a video analytic device 114; a wireless network 124; and a viewing device 128. In operation, in general, the video camera 102 captures source video of a scene, encodes the video, and sends resultant encoded video 104 to the decoder 106. The decoder 106 decodes the encoded video and sends resultant source video 108, 110 to the encoder 112 and the video analytic device 114, respectively. The encoder 112 re-encodes the source video and provides resultant encoded video 122 that is sent by the intermediary device 130 to the viewing device 128 over the wireless network 124. In accordance with the present teachings, the video analytic device 114 performs methods, for instance as described below by reference to FIGS. 2 to 4, to provide pixel density compensation parameters 118 and 120 to the encoder 112 and/or the video camera 102, respectively, for maintaining a minimum pixel density across an object of interest that is contained in the video 122 that is sent over the wireless network 124.

Figure 2:
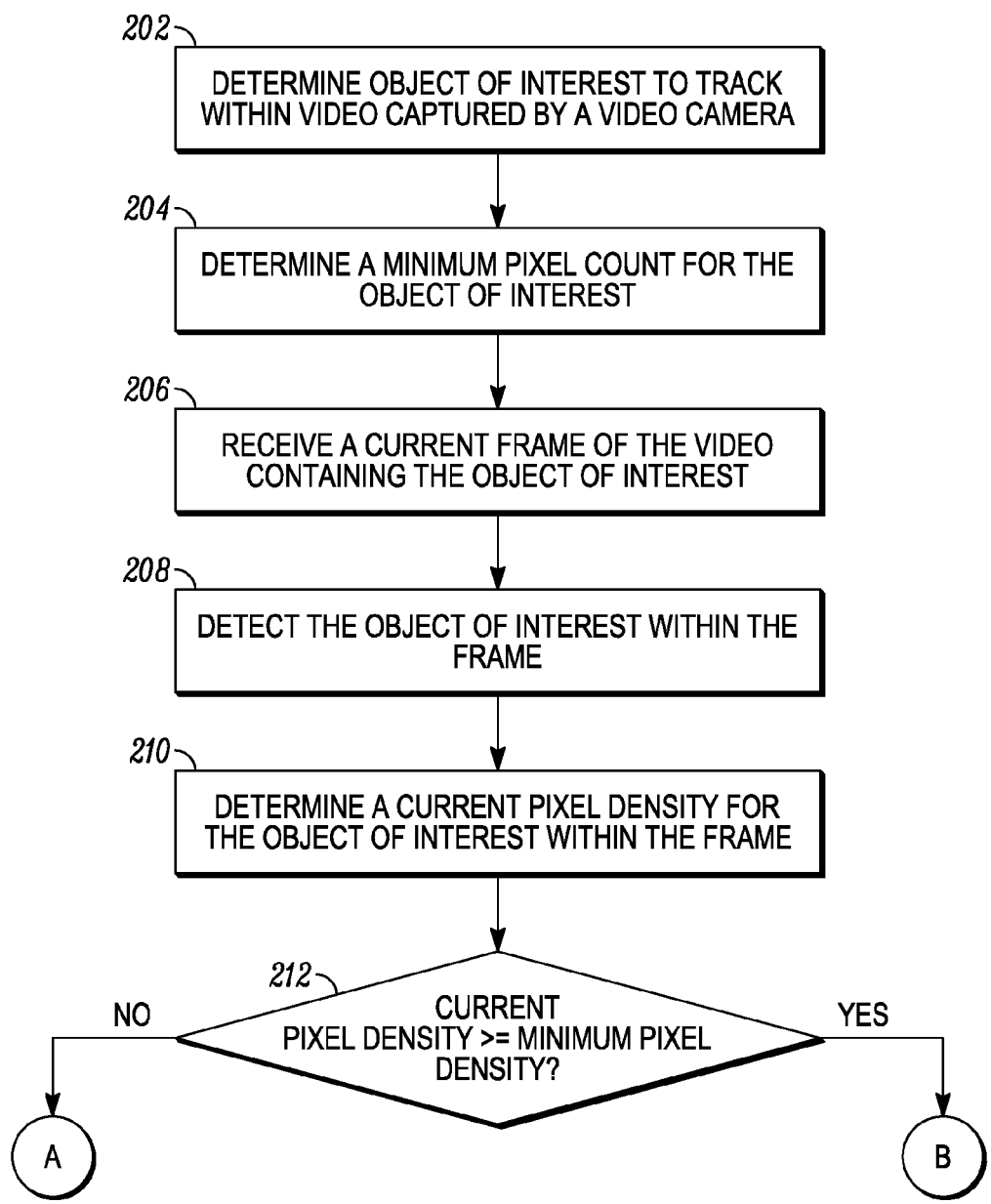
FIG. 2 illustrates a flowchart of a method for maintaining a minimum pixel density across an object of interest within video transmitted over a wireless network, in accordance with some embodiments.
Figure 3:
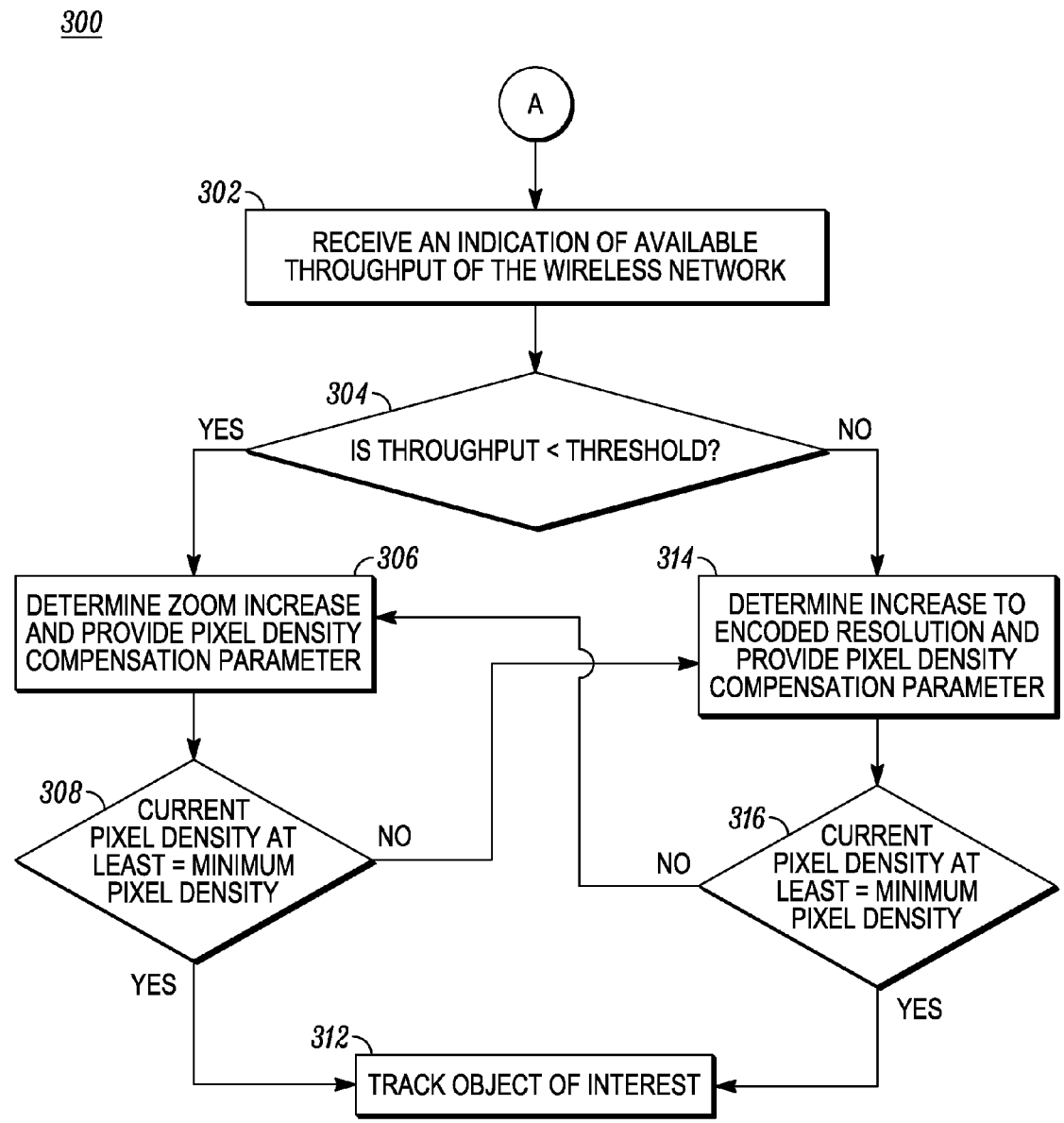
FIG. 3 illustrates a flowchart of a method for maintaining a minimum pixel density across an object of interest within video transmitted over a wireless network, in accordance with some embodiments.
Figure 4:
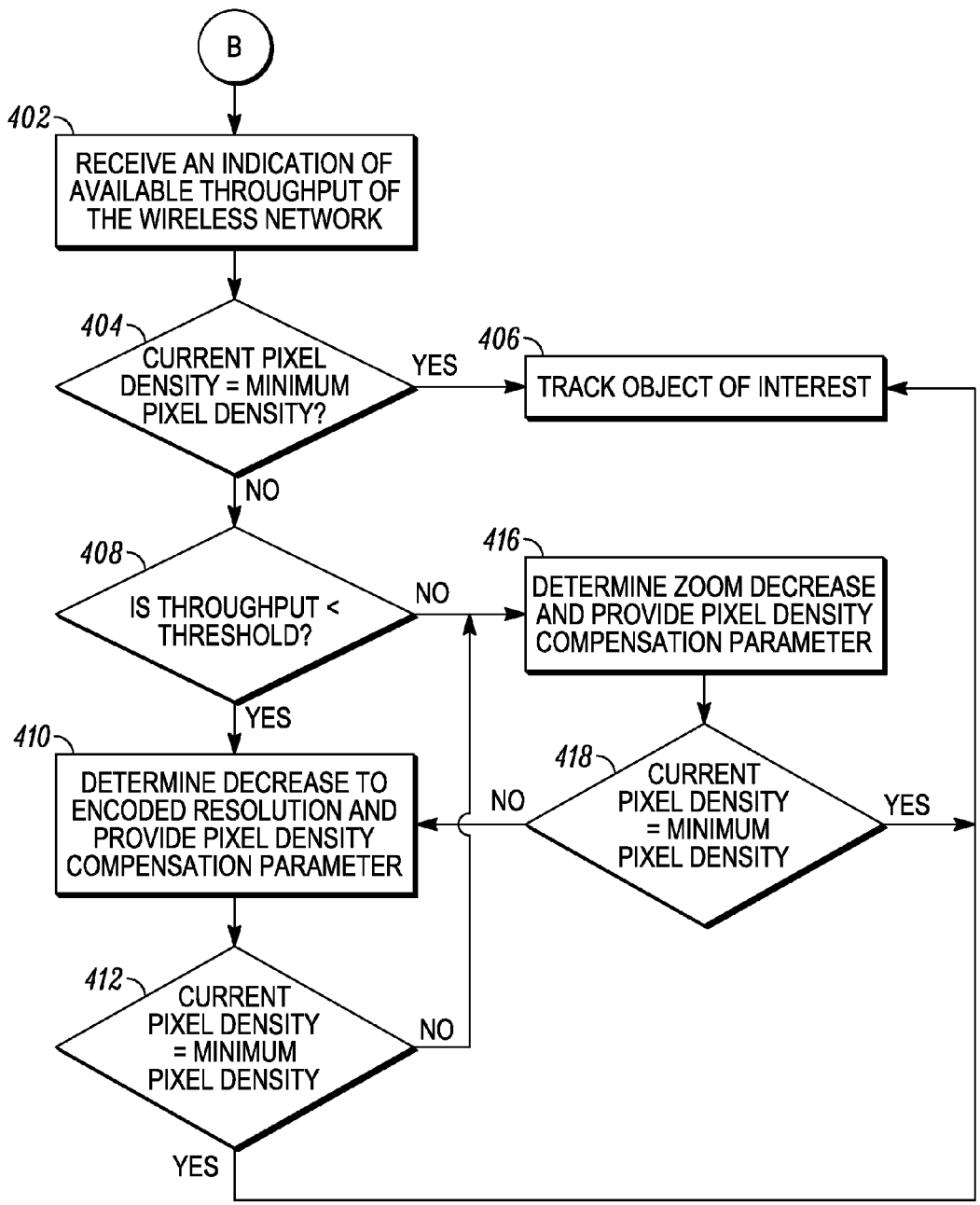
FIG. 4 illustrates a flowchart of a method for maintaining a minimum pixel density across an object of interest within video transmitted over a wireless network, in accordance with some embodiments.

Before describing the functionality of the video analytic device 114 by reference to FIGS. 2 to 4, a more detailed description of the components of the system 100 is provided. The video camera 102 is an analog or digital camera located at a scene of interest. For example, video camera 102 is a video camera within the vehicle of an officer performing a routine traffic stop, is mounted at a toll booth, is a closed-circuit television Internet Protocol (IP) camera used for surveillance of a building or an airport, etc., which sends corresponding video taken at the scene to a viewer who is using the viewing device 128 to monitor the scene. The captured video may also be stored as recorded video on an external storage device (not shown).

Video, as the term is used herein, means a sequence of still images or frames each comprising an array of pixels that represent the portion of a scene imaged by the camera. Associated with each video frame is a field of vision (FoV), which means the angular extent (which can be measured horizontally, vertically, and diagonally) of a given scene that is captured within the video frame. For Public Safety purposes, as the FoV increases, situational assessment (i.e., awareness) by a viewer of the video also increases. Conversely, as the FoV decreases, situational assessment by the viewer decreases. Accordingly, the terms FoV and situational assessment are sometimes used, herein, interchangeably.

In an illustrative embodiment, the video camera 102 has pan, tilt, and zoom adjustment features or controls and a resolution adjustment feature or control. Pan control or panning (i.e., adjusting a pan feature) means the horizontal movement or rotation of the video camera. Tilt control or tilting (i.e., adjusting a tilt feature) means the movement or rotation of the video camera in a vertical plane. Zoom control (i.e., adjusting a zoom feature) means changing a focal length of a zoom lens within the video camera in order to, thereby, change the FoV of the image captured by the video camera. More particularly, increasing the zoom decreases the field of view within frames captured by the video camera. Conversely, decreasing the zoom increases the field of vision within frames captured by the video camera.

Moreover, image resolution (also referred to in the art as pixel resolution and referred to herein as encoded frame resolution) means the detail an image or frame holds based upon the pixel count within the image as described with a set of two positive integers, where the first number is the number of pixel columns (width) and the second number is the number of pixel rows (height), for example 640×480. Generally increasing the encoded frame resolution, thereby, increases the detail or clarity of a frame; and decreasing the encoded frame resolution decreases the detail or clarity of a frame. As mentioned above, the video camera 102 includes a resolution adjustment feature for changing the encoded frame resolution.

Uncompressed video captured by the video camera 102 is termed herein as source video, and the frames of the source video as source frames. The video camera 102 encodes or reformats (i.e., compresses) the captured source frames using any suitable spatial encoding method (e.g., H.264, MPEG-4, MJPEG, etc) to produce the encoded video 104 that it sends to the intermediary device 130 for processing using methods in accordance with the present teachings (described below by reference to FIGS. 2-4) before the encoded video 122 is sent over the wireless network to the viewing device.

The wireless network 124 is any wireless network having resources with sufficient capacity or bandwidth to transport video. In an embodiment, the wireless network 124 is a broadband network that utilizes a broadband access technology such as 3rd Generation Partnership Project (3GPP) Long Term Evolution (LTE), Worldwide Interoperability for Microwave Access (WiMAX), High-Speed Downlink Packet Access (HSDPA), Evolution-Data Optimized (EV-DO), Institute of Electrical and Electronics Engineers (IEEE) 802.11, to name a few.

The wireless network 124 or transmission (i.e., communication) channels used to send media over the network are characterized by a throughput (also referred to herein as available throughput), which is defined as an average rate of successful message delivery over a communication channel and which can be measured in bits per second (bit/s or bps), data packets per second, or data packets per time slot, for instance. Any suitable method can be used to measure network or channel throughput including, but not limited to, Real-Time Transport Control Protocol (RTCP) feedback between the viewing device 128 and the video analytic device 114 over a link 116, wherein RTCP is defined in Internet Engineering Task Force (IETF) Request for Comments (RFC) 3550 dated July 2003, and any subsequent revisions. The video analytic device could alternatively receive a throughput measurement 126 (also referred to herein as an indication of throughput) from an infrastructure device within the wireless network.

The intermediary device can be a server or computer system. The viewing device is any communication device, either mobile or stationary having a display for a user to view the received video. Example viewing devices include, but are not limited to, mobile phones, mobile data terminals, Personal Digital Assistants (PDAs), laptops, Smartphones, and the like. In this illustrative implementation, the video analytic device of the present teachings is included in an intermediary device 130 between the video camera 102 and the viewing device 128. However, in an alternative implementation, system 100 does not include an intermediary device, and the video analytic device shares a physical platform with the video camera 102, which is for instance an IP camera capable of transmitting video over the internet.

In general, as used herein, the system or system components (e.g., the video camera 102, the intermediary device 130 (including the video analytic device 114), the infrastructure devices within network 124, and the viewing device 128) or their hardware being "configured" or "adapted" means that such elements are implemented using one or more (although not shown) memory devices, network interfaces, and/or processing devices that are operatively coupled; and which, when programmed, form the means for the system and system components to implement their desired functionality. This desired functionality includes functionality performed in accordance with the present teachings, for example, as illustrated by reference to the methods shown in FIGS. 2-4.

The network interfaces are used for passing signaling also referred to herein as messaging (e.g., messages, packets, datagrams, frames, superframes, and the like) containing control information and video between the components of the system 100. The implementation of the network interface in any particular component depends on the particular type of network, i.e., wired and/or wireless, to which the component is connected. For example, the video camera 102 and the intermediary device 130, in this illustrative implementation, interface using a wired network interface. However, the intermediary device 130 and the viewing device 128 interface over the wireless network 124 using a wireless network interface.

Where the network supports wireless communications, the network interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system component or through hardware. Examples of wired interfaces include Ethernet, T1, USB interfaces, etc.

The processing devices utilized by the components of system 100 may be partially implemented in hardware and, thereby, programmed with software or firmware logic or code for performing functionality described by reference to FIGS. 2-4; and/or the processing devices may be completely implemented in hardware, for example, as a state machine or ASIC (application specific integrated circuit). The memory implemented by these system components can include short-term and/or long-term storage of various information needed for the functioning of the respective elements. The memory may further store software or firmware for programming the processing device with the logic or code needed to perform its functionality.

We now turn to a detailed description of the functionality of the system 100 components in accordance with the teachings herein and by reference to the remaining figures. FIG. 2 illustrates a logical flow diagram showing a general method 200 performed by a video analytic device (e.g., the video analytic device 114 within the transcoder 130 or one included directly within the video camera 102). The method 200 starts at 202 with the video analytic device determining an object of interest to track within video captured by a video camera. The object of interest can be any item that a viewer is interested in tracking within frames of video such as a gun, a particular person, a vehicle, a license plate, etc.

Often the object of interest depends on the use of the video, such as, for surveillance or to monitor the scene of an incident to which Public Safety personnel are dispatched. In Public Safety applications, the use of the video is also known as a "mission." Use of the video can be determined automatically using suitable logic, for example, depending on the circumstances. For instance, where a police officer stops a vehicle having license plates of a known offender and the officer has a mounted video camera within his vehicle, logic within the intermediary device or the video camera may determine to perform an ID of the driver. In this case, the driver or the driver's face is the object of interest. Alternatively, the viewing user identifies his or her mission or use of the received video, and indicates the object of interest to the video analytic device (e.g., using the link 116 with the viewing device 128). As mentioned above, it is anticipated that the standard bodies working in the area of video quality for Public Safety will release a standard list of missions or use cases, such as "situational assessment", "positive ID", license plate recognition, etc.

Once the mission is determined, the video analytic device determines (204) a minimum pixel density, which is the minimum required pixel count to complete the given mission across both the measured width and height of any object of interest in a video frame. Accordingly, it can be said that the minimum pixel density for any object of interest is based on a specified use or mission for the video. Determining the minimum pixel density is performed, for instance, by way of a lookup into a preconfigured table based on the identified mission. Typical units of measure for minimum pixel density are pixels/foot, pixels/inch, pixels/cm, and the like.

The object of interest is further detected (208) within a received (206) frame of video. This is accomplished either manually or automatically. In the manual case, the user is prompted to draw a bounding box around the object of interest in a video frame, which is indicated to the video analytic device (via link 116 of FIG. 1, for instance). In the automatic case, the video analytic device applies logic to the video to deduce the viewer's object of interest; this is useful, for example, in instances where the object of interest is the only dynamic object in the video frame. In both cases, an object tracking analytic is employed to later track the identified object of interest in the video frame.

If the video is captured in stereo (uncommon), a measurement of the width and height of the object of interest, as visible to the camera, can be directly determined. If the video is captured by a single lens, an object recognition analytic (many such algorithms are known to exist), can be executed to determine the identity of the object of interest within a frame of the video. Based on the identity of the object (e.g., face, gun, car), a lookup table can be used to determinate an estimated measurement of the width and height of the object of interest. Alternatively, if the optics of the lens are well understood, a measurement of the width and height the object of interest can be determined through geometry.

Upon detecting (208) the object of interest within a received video frame, the video analytic device determines (210) the current pixel density for the object of interest within the frame. More particularly, the video analytic device determines the number of vertical and horizontal pixels currently occupied by the object of interest in a frame captured by the video camera at its current settings. A current pixel density across the width of the object of interest is computed by dividing the number of pixels the object of interest is occupying across the horizontal plane by the measured or estimated width of the object. A current pixel density across the height of the object of interest is computed by dividing the number of pixels the object of interest is occupying across the vertical plane by the measured or estimated height of the object.

At 212, the video analytic device compares the current pixel density across both the width and height of the object to the minimum pixel density required. Depending on the results of the comparison (also referred to herein as the "comparison result") and depending on whether or not the throughput is constrained within the wireless network (as determined based on the indication of available throughput) over which the video is sent to the viewing device, the video analytic device selects a pixel density compensation method from a plurality of pixel density compensation methods and determines (using the selected pixel density compensation method) one or more pixel density compensation parameters. The video analytic device provides the pixel density compensation parameters to the video camera or the encoder or both to adjust one or more parameters that, thereby, adjust the current pixel density of the object of interest within the video with respect to the minimum pixel density for the object of interest. Such selecting, determining and adjusting is ideally performed until the minimum pixel density for the object of interest is met or may be performed until it is determined that the minimum pixel density requirement cannot be met due to device (e.g., camera and/or encoder) constraints or limitations.

As will be seen from the methods described by reference to FIGS. 3 and 4, the plurality of pixel density includes at least a first method of adjusting a zoom feature of the camera used to capture the video or a second method of adjusting encoded frame resolution for the camera an encoder used to encode the video for transmission to the viewing device over the wireless network or both. Accordingly, when the video analytic device selects the first method, determining the pixel density compensation parameter comprises determining an amount to increase or decrease the zoom feature of the camera used to capture the video. Moreover, when the video analytic device selects the second compensation parameter, determining the pixel density compensation parameter comprises determining an amount to increase or decrease the encoded frame resolution for the camera or the encoder or both. Additional pixel density compensation methods may include adjusting the pan and tilt features on the camera used to capture the video. Furthermore, selecting the pixel density compensation method is, in some instance, based on maximizing a field of vision within the video frames; and the selecting between the first and second methods can be based upon stored policy.

If the comparison result (of 212) indicates that the current pixel density across either the width or height of the object is less than the minimum pixel density, the method 200 proceeds to branch A, wherein the method continues as method 300 shown in FIG. 3, which provides one illustrative process for adjusting the current pixel density of an object of interest to maintain minimum pixel density for the object of interest. However, if the comparison result (of 212) indicates that the current pixel density across both the width and the height of the object is greater than (i.e., exceeds) the minimum pixel density or exactly equals the minimum pixel density, the method 200 proceeds to branch B, wherein the method continues as method 400 shown in FIG. 4, which provides another illustrative process for adjusting the current pixel density of an object of interest to maintain minimum pixel density for the object of interest.

Turning first to the method 300 shown in FIG. 3. In order to account for the current network conditions in performing its pixel compensation algorithm, the video analytic device receives (302) an indication of available throughput of the wireless network, i.e., an indication of the throughput of the communication channel or bearer, used for transmitting the video to a viewing device. As explained above, throughput is measured, for example, through RTCP feedback from the viewing device or directly from the wireless network. The video analytic device compares (304) the throughput to a known throughput threshold to determine whether or not the wireless network is throughput constrained. The threshold is set, for example, based on a minimum bit rate required to encode video with sufficient spatial quality (e.g., a peak signal-to-noise ratio (PSNR) measurement) at a given resolution (e.g., 640×480) assuming a particular spatial encoding method (e.g., H264).

If the transmission channel between the encoder (in the video camera or the intermediary device depending on the particular implementation) and the viewing device is not throughput constrained (i.e., the available throughput is greater than the throughput threshold), then the video analytic device determines (314) an increased resolution requirement (i.e., an increase to the encoded frame resolution) such that the object of interest is encoded by the minimum number of pixels required by the mission. This can be calculated, for example, according to the simple formula: ReqRes.Width= (ReqObjPixDen/CurrentObjPixDen.Width)*CurrentRes.Width; ReqRes.Height=(ReqObjPixDen/CurrentObjPixDen.Height)*CurrentRes.Height.

In this formula, ReqRes.Width is the required width value of the encoded resolution setting, in order to meet the minimum pixel density for the object of interest; the ReqObjPixDen is the minimum pixel density of the object of interest to meet the pixel density requirements of the mission; CurrentObjPixDen.Width is the current pixel density across the width of the object of interest; and CurrentRes.Width is the current width value of the resolution setting for the video camera. Moreover, in the formula, ReqRes.Height is the required height value of the resolution setting for the video camera, in order to meet the minimum pixel density for the object of interest; the ReqObjPixDen is the minimum pixel density of the object of interest to meet the pixel density requirements of the mission; CurrentObjPixDen.Height is the current pixel density across the height of the object of interest; and CurrentRes.Height is the current height value of the resolution setting for the video camera.

The computed increase in encoded frame resolution can be quantized up to standard resolutions (e.g., 320×240, 640× 480, 1280×720, 1920×1080), such that the quantized resolution is at least as high as the computed required encoded frame resolution. This is required for encoders that do not support arbitrary encoded frame resolutions. By increasing the encoded frame resolution, the field of vision can remain fixed, while still meeting the required pixel density criteria.

Notably, the encoded frame resolution (i.e., encoded resolution) may be adjusted at the video camera source, or at an intermediary transcoding device (such as a back end server), or in both devices, if necessary. For example, if the video analytic device is embodied in an intermediary transcoding device (e.g., the intermediary device 130), the encoded resolution may be adjusted at both the video camera 102 and the encoder 112. In instances where the video camera 102 supports only a single encoded resolution (e.g., an analog camera), or instances where it may be advantageous to otherwise maintain a fixed encoded resolution (e.g., if the camera's output is being recorded for archival purposes), it may be advantageous to adjust the encoded resolution only in the encoder 112. Conversely, where no intermediary device is used, the encoded resolution is increased at the video camera alone.

To adjust the encoded resolution, the video analytic device generates a "pixel density compensation parameter" that it sends to the encoder within the video camera and/or to the encoder within the transcoding device. A pixel density compensation parameter is defined as a representation of an amount of control adjustment of a parameter within a video camera or an encoder, wherein the adjustment correspondingly changes the current pixel density of an object of interest. In the illustrative system 100 of FIG. 1, the pixel density compensation parameters 120 and 118 indicate to the video camera 102 and to the encoder 112, respectively, the amount by which to increase the encoded frame resolution or the final encoded frame resolution adjustment needed based upon the calculations.

The video analytic device determines, at 316, whether the adjustment performed by the camera and/or encoder was sufficient to meet the minimum pixel density requirement for the object of interest. If so, the video analytic device exits the pixel density compensation algorithm 300 and continues to track (312) the object of interest using any suitable object tracking analytic software. In some cases, even after adjusting the encoded frame resolution, the current pixel density of the object of interest still fails to meet the minimum pixel density requirement (i.e., fails to increase the current pixel density to at least the minimum pixel density). For example, the video analytic device determines that an encoded frame resolution of 1280×720 is necessary, but the transcoder is currently unable to provide such a high resolution due to a failure to meet a threshold specifying a minimum bit rate required to encode video with sufficient spatial quality at a given resolution. In such a case, the video analytic device reconfigures (314) the video camera and transcoder to the maximum encoded frame resolution currently permitted given the throughput constraints to viewing device 128. The video analytic device then proceeds to determine an amount to increase (306) the zoom setting or feature of the camera (and thereby decrease the field of view within the frame) until it is determined (at 308) that the current pixel density of the object of interest has been increased enough to meet the minimum pixel density. At which time, the video analytic device exits the algorithm 300 and tracks (312) the object of interest.

The magnitude of manipulation of the zoom feature within the camera depends upon the type of zoom control interface offered by the camera. Notably, the camera may support an optical (e.g., change in focal length) and/or digital (pixel subset selection) means of increasing or decreasing its field of vision magnification factor. In one embodiment, the video analytic device executes a "move and test" loop. Using such a loop, the video analytic device adjusts the video camera's zoom control by a small magnitude. Object tracking is then used to determine the new bounding pixel box for the object of interest. The pixel density of the object is then recomputed and compared (308) to the required pixel density, and the loop is repeated or exited appropriately. In another embodiment, the optics of the camera's lens are well understood, and the camera's zoom control can be adjusted to the exact magnitude required. Notably, the pan and tilt controls may also be manipulated to keep the object within the field of vision. This slewing of pan and tilt can also be affected using the object tracking analytic, as is known to those skilled in the art.

Turning momentarily back to 304 of method 300, when the transmission channel between the encoder and the viewing device is throughput constrained (i.e., when the available throughput is less than the throughput threshold), and the camera supports zoom controls, then the video analytic device automatically manipulates (306) the video camera's zoom control to determine an amount to increase the zoom feature and, thereby, decrease the field of vision in the frame, in an attempt to meet the minimum pixel density for the object of interest. Thus, in some instances, the zoom feature can be increased until the minimum pixel density is met. As explained above, pan and tilt controls may also be adjusted during this process to maintain the object of interest completely within the field of view of the frame. By manipulating the pan-tilt-zoom controls of the camera, the resolution (and required throughput for the video transmission) can remain fixed, while still meeting the required pixel density criteria.

If the video analytic device determines (308) that the zoom adjustment is insufficient (i.e., fails) to increase the current pixel density to meet the minimum pixel density requirement (due to the zoom limits of the video camera), an encoded frame resolution increase is determined and the appropriate adjustments made (314) at the camera (and/or transcoder) until it is determined (316) that the minimum pixel density requirement is met. If the minimum pixel density cannot be met through a combination of zoom (due to zoom limit constraints) and encoded frame resolution adjustment (due to throughput constraints), the algorithm may take one of two actions based on a configured policy. In some instances, it may be advantageous to bring the pixel density of the object of interest as close as possible to the required pixel density until zoon feature limits of the camera or throughput limits are reached. In other instances, it may be advantageous to report a failure to achieve the required minimum pixel density to the system; in such instances, a policy or operating user may choose to end the transmission since it fails to provide a required video quality for the selected mission. The algorithm 300 is then exited, and the video analytic device continues to track (312) the object of interest.

Turning momentarily back to 212 of FIG. 2, if the comparison result indicates that the object of interest currently exhibits a higher pixel density than is required for the selected video mission (i.e., the current pixel density is greater than the minimum pixel density), then the video analytic device may decrease the encoded frame resolution to decrease channel throughput requirements for the video, or increase the field of vision through pan-tilt-zoom manipulation to provide greater situational awareness. In this sense, the resolution and field of vision are optimally adjusted. In addition, when the transmission channel for sending the video over the wireless network is not throughput constrained, in an embodiment, the video analytic device relies on stored policy to determine how best to optimize the encoded frame resolution and zoom settings so as not to unnecessarily waste network resources, but while also maximizing situation awareness for the video viewer.

More particularly, an illustrative algorithm 400 shown in FIG. 4 is performed when the current pixel density for an object of interest exceeds or meets the minimum pixel density. In order to optimize algorithm 400, the video analytic device receives (402) an indication of available throughput over the wireless network as indicated, for example, by the measured throughput of the transmission channel or by a throughput indication directly from the wireless network. If the result of a comparison (404) of the current pixel density to the minimum pixel density indicates that object of interest exhibits the minimum pixel density required for the selected video mission, then no action is taken by the video analytic device to adjust video camera or encoder settings. The video analytic device simply continues to track (406) the object of interest.

If, at 404, the current pixel density of the object of interest exceeds the minimum pixel density, the video analytic device compares (408) the throughput to a throughout threshold. If the available throughput is greater than the throughput threshold indicating that the transmission channel is not bandwidth constrained (i.e., throughput constrained), in this case (and perhaps based on policy of a Public Safety agency) the video analytic device determines an amount to decrease (416) the zoom feature for the video camera in order to increase situational awareness of the contents within the video until it is determined (418) that the minimum pixel density is reached or the physical limitation of the zoom control is reached. Where the amount of decrease to the zoom feature fails to decrease the current pixel density to the minimum pixel density, the video analytic device may also determine an amount to decrease (410) the encoded frame resolution of the video camera (and transcoder if one is used) to decrease the current pixel density until the minimum pixel density is reached. This reduces the throughput of the transmission (at the expense of situational awareness), freeing up bandwidth in the network for transmission of other media. As previously noted, a configured (i.e., stored) policy determines an operator's preference to maximize situational awareness or to reduce throughput. The video analytic device then exits the algorithm 400 and continues tracking (406) the object of interest within the video frames.

Turning back to 408 of method 400, where the available throughput is less than the throughput threshold indicating that the transmission channel is bandwidth constrained, the video analytic device determines an amount of decrease to the encoded frame resolution of the camera (and transcoder), at 410, in order to decrease the current pixel density and reduce the bandwidth requirements of the video until it is determined (412) that the minimum pixel density is reached or a limitation of the encoder resolution is reached. Where the amount of decrease to the encoded frame resolution fails to decrease the current pixel density to the minimum pixel density, the video analytic device determines an amount to decrease (416) the zoom feature for the video camera to decrease the current pixel density until it is determined (418) that the minimum pixel density is reached. The video analytic device then exits the algorithm 400 and continues tracking (406) the object of interest within the video frames.

Methods 200, 300, and 400 can be periodically performed by the video analytic device or performed as needed based on a triggering event. For example, if the object of interest moves within the video frame, as detected by the object tracking analytic, or the transmission channel conditions change, the methods are again executed. Illustrative benefits of the teachings herein are the automatic delivery of video having a quality that meets the mission needs of a viewer and that meets a defendable legal standard while occupying the minimum throughput required and/or maximizing situational awareness.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage element (i.e., medium) having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for maintaining a minimum pixel density across an object of interest, the method comprising:
   receiving a frame of video, wherein the received frame contains an object of interest;
   determining a current pixel density of the object of interest within the received frame;
   comparing the current pixel density to a minimum pixel density for the object of interest to generate a comparison result;
   receiving an indication of available throughput of a wireless network used for transmitting the video to a viewing device;
   selecting a pixel density compensation method from a plurality of pixel density compensation methods used to adjust the current pixel density, wherein the selecting is based on the comparison result and the indication of available throughput, wherein the plurality of pixel density compensation methods comprises a first method of adjusting a zoom feature of a camera used to capture the video and a second method of adjusting encoded frame resolution for at least one of the camera or an encoder used to encode the video for transmission to the viewing device over the wireless network;
   determining, using the selected pixel density compensation method, a pixel density compensation parameter to adjust the current pixel density with respect to the minimum pixel density for the object of interest;
   providing the pixel density compensation parameter to at least one of the camera or the encoder.

2. The method of claim 1, wherein the minimum pixel density for the object of interest is based on a specified use for the video.

3. The method of claim 1, wherein the selecting of the pixel density compensation method is further based on maximizing a field of vision within the video frames.

4. The method of claim 1, wherein when the comparison result indicates that the current pixel density is less than the minimum pixel density, and the available throughput is less than a throughput threshold, the method further comprising:
   selecting the first method;
   wherein determining the pixel density compensation parameter comprises determining an amount to increase the zoom feature of the camera used to capture the video.

5. The method of claim 4, wherein the zoom feature is increased until the minimum pixel density is met.

6. The method of claim 4, wherein when the amount to increase the zoom feature fails to increase the current pixel density to at least the minimum pixel density, the method further comprising:
   selecting the second method;
   determining an amount to increase the encoded frame resolution for at least one of the camera or the encoder, which increases the current pixel density to at least the minimum pixel density.

7. The method of claim 1, wherein when the comparison result indicates that the current pixel density is less than the minimum pixel density, and the available throughput is greater than a throughput threshold, the method further comprising:
   selecting the second method;
   wherein determining the pixel density compensation parameter comprises determining an amount to increase the encoded frame resolution for at least one of the camera or the encoder.

8. The method of claim 7, wherein when the amount to increase the encoded frame resolution fails to increase the current pixel density to at least the minimum pixel density, the method further comprising:
   selecting the first method;
   determining an amount to increase the zoom feature of the camera used to capture the video, which increases the current pixel density to at least the minimum pixel density.

9. The method of claim 1, wherein when the comparison result indicates that the current pixel density is greater than the minimum pixel density, and the available throughput is less than a throughput threshold, the method further comprising:
   selecting the second method;
   wherein determining the pixel density compensation parameter comprises determining an amount to decrease the encoded frame resolution for at least one of the camera or the encoder.

10. The method of claim 9, wherein when the amount to decrease the encoded frame resolution fails to decrease the current pixel density to the minimum pixel density, the method further comprising:
    selecting the first method;
    determining an amount to decrease the zoom feature of the camera used to capture the video, which decreases the current pixel density to the minimum pixel density.

11. The method of claim 1, wherein when the comparison result indicates that the current pixel density is greater than the minimum pixel density and the available throughput is greater than a throughput threshold, the method further comprising:
    selecting the first method;
    wherein determining the pixel density compensation parameter comprises determining an amount to decrease a zoom feature of the camera used to capture the video.

12. The method of claim 11, wherein when the amount to decrease the zoom feature fails to decrease the current pixel density to the minimum pixel density, the method further comprising:
- selecting the second method;
- determining an amount to decrease the encoded frame resolution for at least one of the camera or the encoder, which decreases the current pixel density to the minimum pixel density.

13. The method of claim 1, wherein when the comparison result indicates that the current pixel density is greater than the minimum pixel density and the available throughput is greater than a throughput threshold, the method further comprising selecting between the first and second methods based upon stored policy.

14. The method of claim 1, wherein the selecting, determining and providing are performed at least until the minimum pixel density is met.

15. The method of claim 1, wherein the selecting, determining and providing are performed at least until at least one of zoom feature limits of the camera or available throughput limits are reached.

16. The method of claim 15 further comprising reporting a failure to meet the minimum pixel density for the object of interest.

17. Apparatus for maintaining a minimum pixel density across an object of interest, the apparatus comprising:
- an interface configured to receive a frame of video, wherein the received frame contains an object of interest and receive an indication of available throughput of a wireless network used for transmitting the video to a viewing device;
- a processing device configured to:
  - determine a current pixel density of the object of interest within the received frame;
  - compare the current pixel density to a minimum pixel density for the object of interest to generate a comparison result;
  - select a pixel density compensation method from a plurality of pixel density compensation methods used to adjust the current pixel density, wherein the selecting is based on the comparison result and the indication of available throughput, wherein the plurality of pixel density compensation methods comprises a first method of adjusting a zoom feature of a camera used to capture the video and a second method of adjusting encoded frame resolution for at least one of the camera or an encoder used to encode the video for transmission to the viewing device over the wireless network;
  - determine, using the selected pixel density compensation method, a pixel density compensation parameter to adjust the current pixel density with respect to the minimum pixel density for the object of interest;
- wherein the interface is further configured to provide the pixel density compensation parameter to at least one of the camera or the encoder.

18. A non-transitory computer-readable storage element having computer readable code stored thereon for programming a computer to perform a method for maintaining a minimum pixel density across an object of interest, the method comprising:
- receiving a frame of video, wherein the received frame contains an object of interest;
- determining a current pixel density of the object of interest within the received frame;
- comparing the current pixel density to a minimum pixel density for the object of interest to generate a comparison result;
- receiving an indication of available throughput of a wireless network used for transmitting the video to a viewing device;
- selecting a pixel density compensation method from a plurality of pixel density compensation methods used to adjust the current pixel density, wherein the selecting is based on the comparison result and the indication of available throughput, wherein the plurality of pixel density compensation methods comprises a first method of adjusting a zoom feature of a camera used to capture the video and a second method of adjusting encoded frame resolution for at least one of the camera or an encoder used to encode the video for transmission to the viewing device over the wireless network;
- determining, using the selected pixel density compensation method, a pixel density compensation parameter to adjust the current pixel density with respect to the minimum pixel density for the object of interest;
- providing the pixel density compensation parameter to at least one of the camera or the encoder.

* * * * *